United States Patent
Hong

(10) Patent No.: US 8,708,321 B2
(45) Date of Patent: Apr. 29, 2014

(54) INSULATING FILM ATTACHING JIG AND BATTERY CELL MANUFACTURED BY USING THE SAME

(75) Inventor: Sung-Ho Hong, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 0 days.

(21) Appl. No.: 13/370,090

(22) Filed: Feb. 9, 2012

(65) Prior Publication Data
US 2013/0029212 A1    Jan. 31, 2013

Related U.S. Application Data

(60) Provisional application No. 61/513,350, filed on Jul. 29, 2011.

(51) Int. Cl.
| B23P 19/00 | (2006.01) |
| B23P 19/10 | (2006.01) |
| B25B 11/00 | (2006.01) |
| H01M 10/14 | (2006.01) |
| H01M 2/02 | (2006.01) |

(52) U.S. Cl.
USPC ............ 269/21; 29/730; 29/743; 29/760; 429/163; 429/179

(58) Field of Classification Search
None
See application file for complete search history.

(56) References Cited

U.S. PATENT DOCUMENTS

| 4,353,672 | A | * | 10/1982 | Smith ............................ 409/97 |
| 4,427,332 | A | * | 1/1984 | Manriquez ............... 414/331.18 |
| 2006/0257731 | A1 | | 11/2006 | Yoon |
| 2009/0087692 | A1 | * | 4/2009 | Park et al. ........................ 429/7 |
| 2011/0091766 | A1 | | 4/2011 | Kim |
| 2011/0177326 | A1 | | 7/2011 | Mitchell |

FOREIGN PATENT DOCUMENTS

| JP | 2001097331 | * 10/2001 |
| JP | 2004-195830 A | 7/2004 |
| KR | 2001-0039913 A | 5/2001 |

OTHER PUBLICATIONS

Examiner Annotated Figure 9 of Hashimoto et al.*

* cited by examiner

*Primary Examiner* — Ula C Ruddock
*Assistant Examiner* — Matthew Van Oudenaren
(74) *Attorney, Agent, or Firm* — Robert E. Bushnell, Esq.

(57) ABSTRACT

A secondary battery, a jig suitable for fabrication of the secondary battery, and a method for producing a secondary battery constructed with a case accommodating the electrode assembly. The case includes a front portion terminated along opposite edges by a first wing portion and a second wing portion, and a back portion positioned opposite to the front portion, with insulating film bent along a length of a junction between the front portion and each of the first wing portion and the second wing portion, a pair of holes in the insulating film are held in parallel alignment with respect to the length of the junction, with the insulating film adhering to and covering the front portion and a corresponding one of the first wing portion and the second wing portion, in order to prevent leakage of electrolyte, and resulting corrosion of the electrically conducting metal components of the secondary battery.

15 Claims, 19 Drawing Sheets

INSULATING FILM ATTACHING JIG AND BATTERY CELL MANUFACTURED BY USING THE SAME

CLAIM OF PRIORITY

This application makes reference to, incorporates the same herein, and claims all benefits accruing under 35 U.S.C. §119 from an application earlier filed in the U.S. Patent and Trademark Office on 29 Jul. 2011 and there duly assigned Ser. No. 61/513,350.

BACKGROUND OF THE INVENTION

1. Field of the Invention

One or more embodiments of the present invention relate to an insulating film attaching jig and a battery cell manufactured by using the same.

2. Description of Related Art

In general, secondary batteries, which are rechargeable batteries unlike non-rechargeable primary batteries, are widely used in small high-tech electronic devices such as mobile phones, personal digital assistants (PDAs), and laptop computers.

Among the various types of secondary batteries, a pouch-type secondary battery, which receives and seals an electrode assembly in a soft pouch-shaped case, provides a higher battery capacity than does an angular or a cylindrical secondary battery that encases an electrode assembly in a metal can, because a thickness of the pouch-type case is much smaller than a thickness of the metal can. Due to the thinness of the pouch-type case, it is possible to provide space for a larger electrode assembly, resulting in a higher capacity and electrical power density than may be attained with a secondary battery of a same overall exterior size.

Although the pouch-type case may increase the battery's capacity and may be easily fabricated in diverse shapes, the pouch-type case is readily susceptible to cracking. Upon the case being cracked, a rapid onset of corrosion leading to a short circuit occurs between an electrically conducting metal component included in the pouch-type case and a cathode plate.

SUMMARY OF THE INVENTION

One aspect of the present invention is to provide for a design for a pouch type battery that prevents the occurrence of an electrical short circuit between a metal layer present in the fabrication of the pouch and the electrode assembly.

Another aspect of the present invention is to provide a method of making the battery having a design that an electrical short circuit between a metal layer in the pouch and other electrically conducting components of the pouch type battery is not apt to occur.

It is still yet an aspect of the present invention to provide a design for a jig that is used to make the battery, and a jig able to attain precise and repeatable alignment between the longitudinal, or longer lengths, of the components of the battery during fabrication.

According to one aspect of the present invention, there is provided a battery cell that includes an electrode assembly, a case accommodating the electrode assembly, the case including a front portion and a back portion terminated along opposite edges by a first wing portion positioned opposite from a second wing portion and an insulating film bent along a length of a junction between the front portion and one of the first wing portion and the second wing portion, while a pair of holes in the insulating film are held in parallel alignment with respect to the length of the junction, the insulating film adhering to and covering the front portion and the one of the first wing portion and the second wing portion along a length of the one of the first and second wing portions.

The insulating film may have a first portion adhering to one of the first and second wing portions and a second portion adhering to the front portion of the case. The second portion of the insulating film may extend in a direction that is substantially orthogonal to the first portion. The electrode assembly may include a cathode tab and an anode tab extending to an outside of the case. The electrode assembly may include a separator arranged between a cathode plate and an anode plate, the cathode tab may be connected to the cathode plate and the anode tab may be connected to the anode plate.

According to another aspect of the present invention, there is provided a jig that includes a support, a cell mount coupled to the support and providing an inclined surface to hold a battery cell thereon and a film support arranged on top of the support and including a flat surface to support at least a part of an insulating film, the flat surface having a plurality of fixing members and a plurality of suction holes to prevent the insulating film from moving. The support may include a plurality of supporting parts, a height of the support is adjustable by adjusting a relative position of the supporting parts. The support may include a first support, a second support and a third support, the first support may be a base, the second support may extend vertically and perpendicularly from the first support, the third support may be arranged near a top of the second support, the film support may be arranged on the third support. The film support may be rotatable with respect to the support. The second support may have an elongated slot that couples to a coupling hole in the third support by one of the bolts, the elongated slot in the second support may be substantially larger than the coupling hole in the third support to allow the film support and the third support to be raised and lowered with respect to the first and second supports. The film support may also include a vacuum port that communicates with the suction holes and attaches to tubing that connects to a vacuum pump. Each of the fixing members may protrude from the flat surface of the film support to guide and align the insulating film onto the flat surface.

According to yet another aspect of the present invention, there is provided a method, including preparing a bare cell by inserting an electrode assembly into a receiving space in a lower case, sealing together an upper case to the lower case, and producing first and second wing portions on opposite sides of the bare cell by folding over edges of the case where the upper case is sealed to the lower case, placing the bare cell sideways onto a mount space of a jig so that first wing portion faces upwards and is in a vicinity of a film support of the jig, fixing a first insulating film onto the film support of the jig, attaching a first portion of the first insulating film to the first wing portion of the bare cell, removing the bare cell from the jig with the first portion of the first insulating film attached thereto and attaching a second portion of the first insulating film to a front surface of the bare cell. The method may also include attaching a second insulating film to the second wing portion of the bare cell in a manner similar to the above attachment of the first insulating film to the first wing portion.

The fixing of the first insulating film onto the film support may include placing the first insulating film, wherein a plurality of fixing members protruding from the film support are inserted into holes arranged in each of the first insulating film and a backing paper attached to one side of the first insulating film and applying suction to suction holes formed in the film support covered by the backing paper. The fixing the first insulating film to the film support may include placing the first insulating film, a backing paper being attached to one side of the first insulating film, a plurality of fixing members protruding from the film support are inserted into holes arranged in a portion of the backing paper not covered by the first insulating film and applying suction to suction holes formed in the film support and covered by the backing paper.

The attaching the first portion of the first insulating film to the first wing portion of the bare cell may include rotating up the combination of the film support and the first insulating film with respect to the bare cell mounted on the jig, exposing an adhesive on a bottom of a first portion of the first insulating film that projects from an edge of the film support by removing a corresponding first portion of the backing paper and adhering a first portion of the insulating film to the first wing portion of the bare cell by rotating back down the combination of the film support and the first insulating film. The attaching the second portion of the first insulating film to the front surface of the bare cell may include removing a second portion of the backing paper from the second portion of the first insulating film and folding over the second portion of the first insulating film onto the front surface of the bare cell so that the second portion is orthogonal to the first portion of the insulating film.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The advantages and features of the present invention and methods of achieving the advantages and features will be described more fully with reference to the accompanying drawings, in which exemplary embodiments of the invention are shown. The invention may, however, be embodied in many different forms and should not be construed as being limited to the embodiments set forth herein; rather these embodiments are provided so that this disclosure will be thorough and complete, and will fully convey the concept of the invention to one of ordinary skill in the art. Meanwhile, the terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. It will be further understood that the terms "comprises" and/or "comprising" used herein specify the presence of stated features, integers, steps, operations, members, components, and/or groups thereof, but do not preclude the presence or addition of one or more other features, integers, steps, operations, members, components, and/or groups thereof. It will be understood that, although the terms first, second, etc. may be used herein to describe various elements, these elements should not be limited by these terms. These terms are only used to distinguish one element from another.

Figure 1:
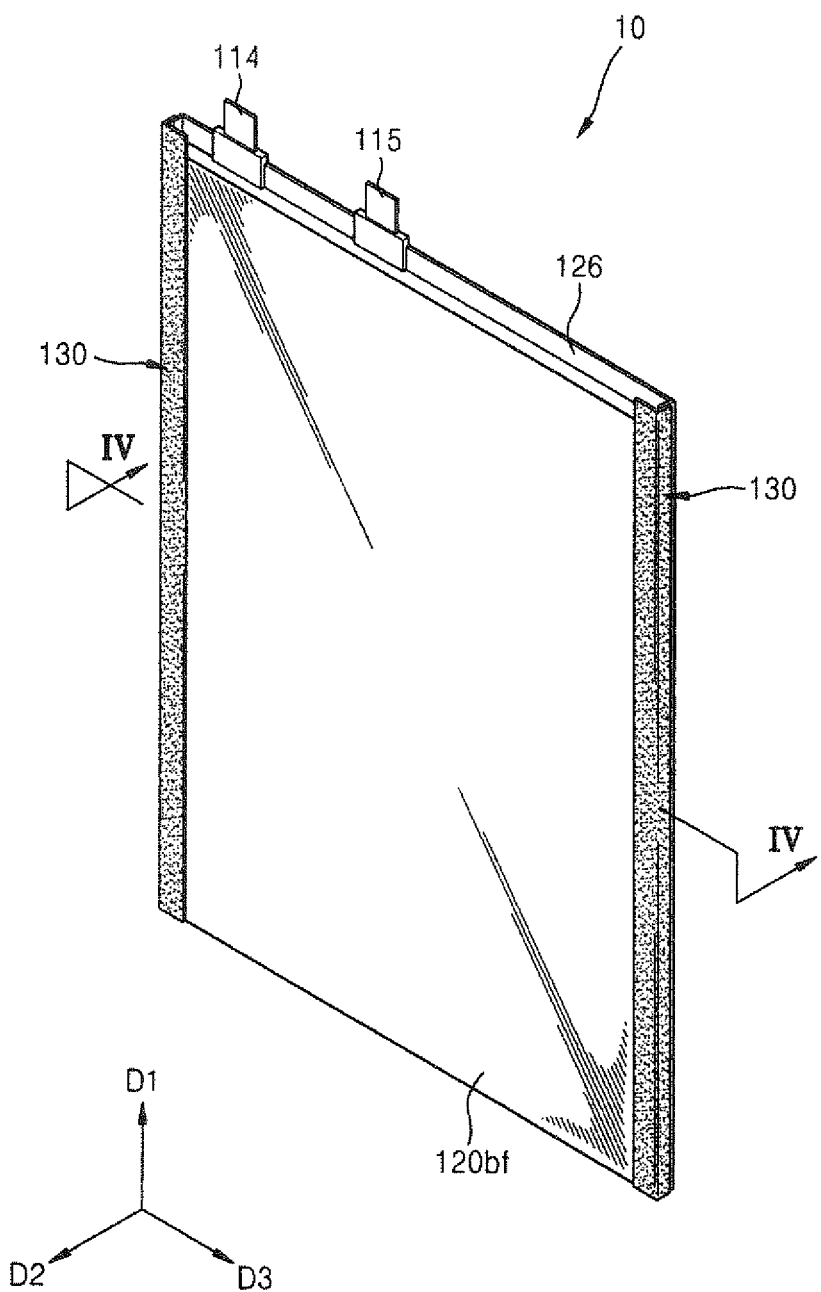
FIG. 1 is an oblique view illustrating a battery cell according to a first embodiment of the present invention.
Figure 2:
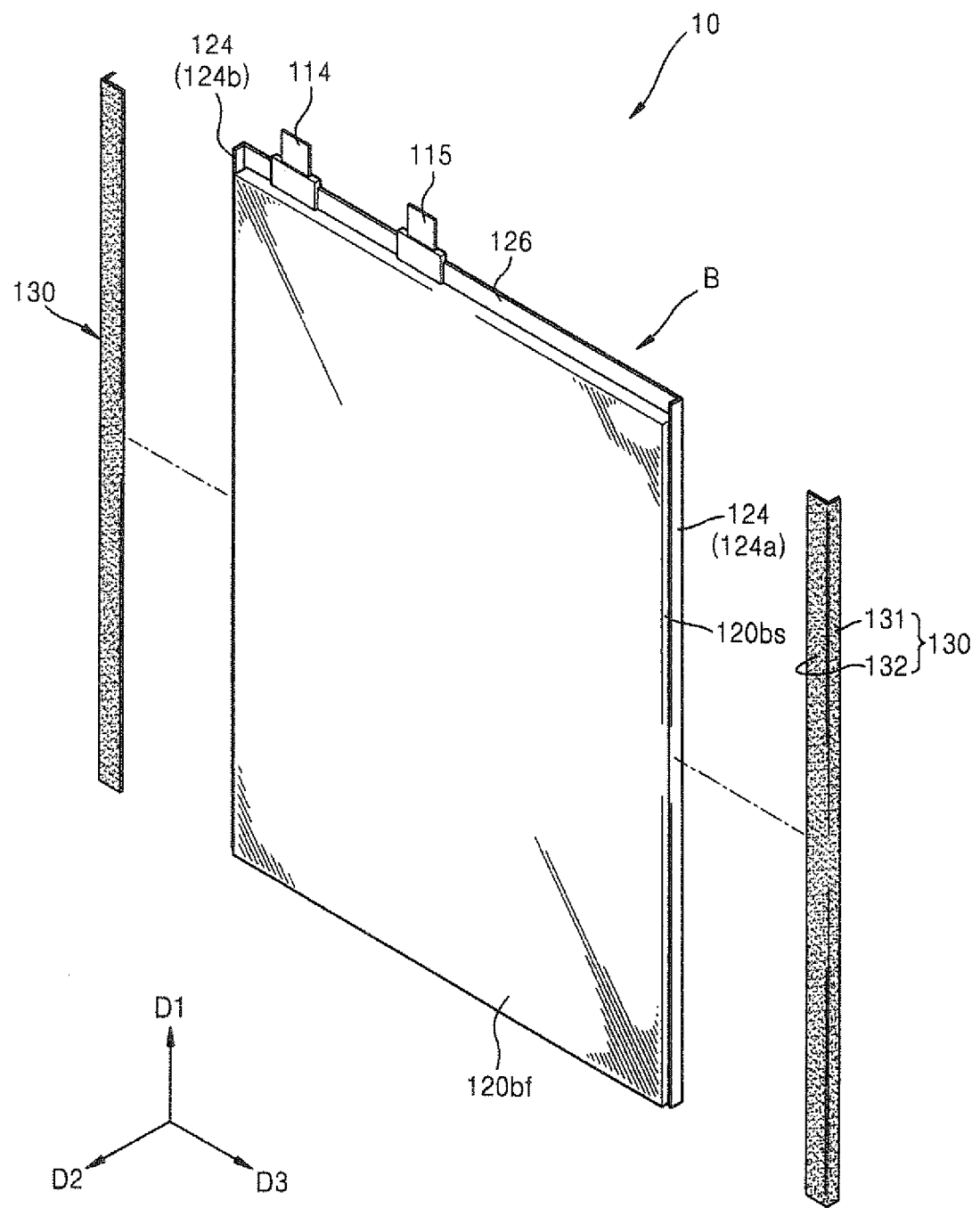
FIG. 2 is an exploded oblique view illustrating the battery cell of FIG. 1.
Figure 3:
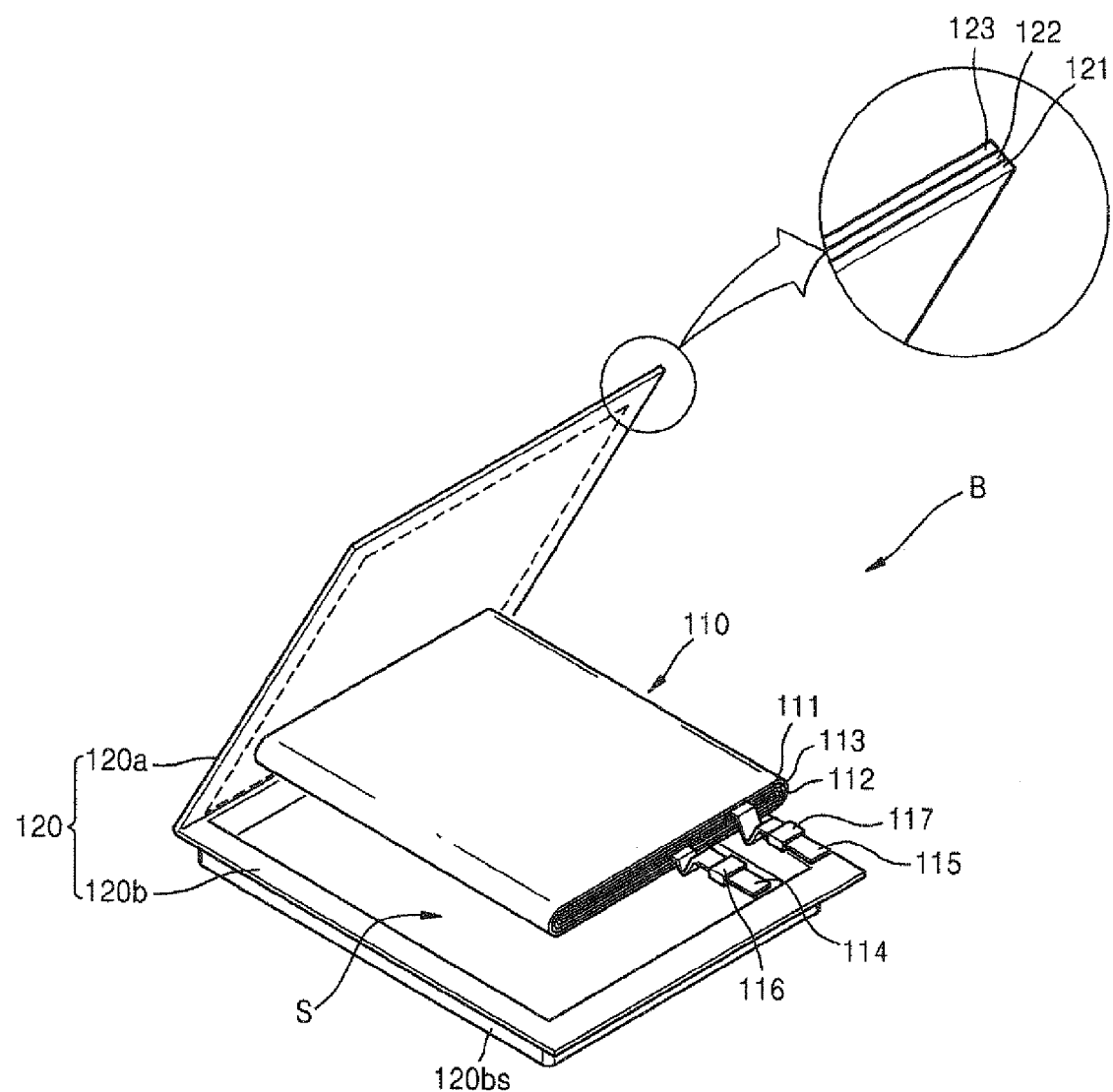
FIG. 3 is an oblique view illustrating a case and an electrode assembly of the battery cell of FIG. 1.
Figure 4:
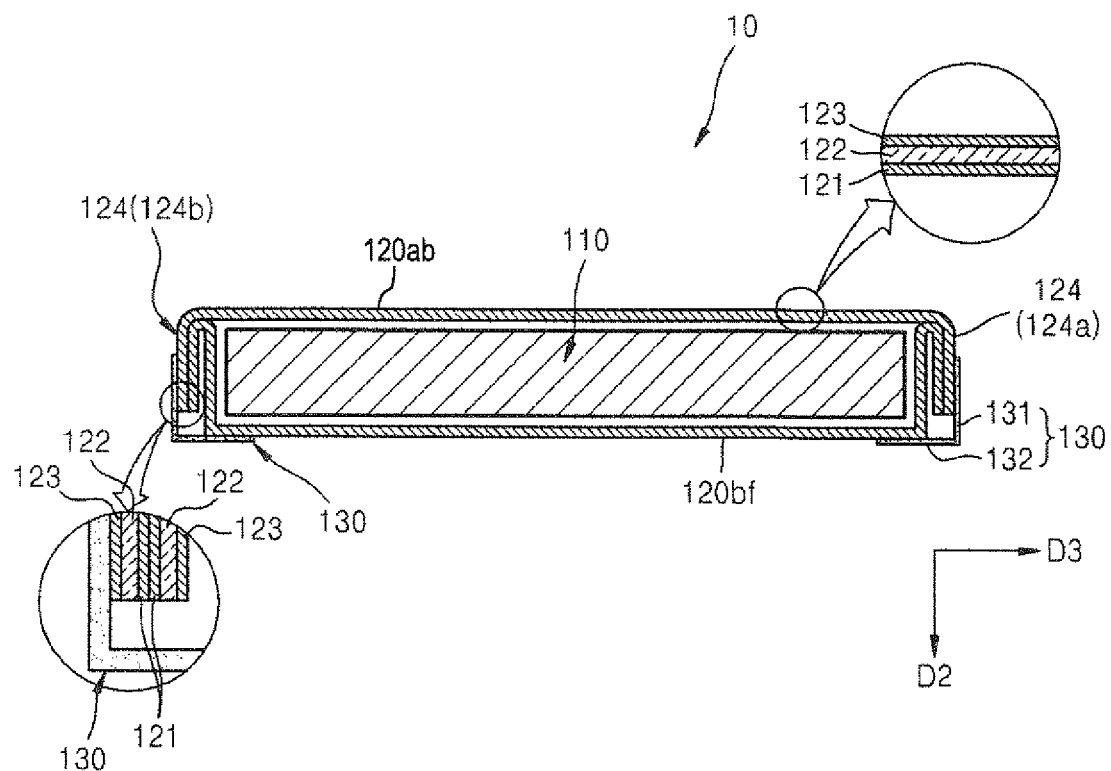
FIG. 4 is a cross-sectional view taken along sectional line IV-IV from FIG. 1.

Turning now to FIGS. 1 through 4, FIG. 1 is an oblique view illustrating a battery cell 10 according to a first embodiment of the present invention, FIG. 2 is an exploded oblique view illustrating the battery cell 10 of FIG. 1, FIG. 3 is an oblique view illustrating a case 120 and an electrode assembly 110 of the battery cell 10 of FIG. 1 and FIG. 4 is a cross-sectional view taken along line IV-IV of FIG. 1.

Referring to FIGS. 1 through 4, the battery cell 10 includes a bare cell B including the electrode assembly 110 and the case 120, and insulating films 130 attached to one or more sides of the bare cell B.

The electrode assembly 110 includes an anode plate 111 and a cathode electrode 112, and a separator 113 disposed between the anode plate 111 and the cathode plate 112. The anode plate 111 includes an anode active material portion formed by applying an anode active material onto a surface of an anode current collector made out of aluminum or the like, and a non-anode active material portion being absent of an anode active material. The anode active material may be, for example, a lithium chalcogenide compound or a lithium transition metal oxide such as $LiCoO_2$, $LiNiO_2$, $LiMnO_2$, or $LiMnO_4$. An anode tab 114 having a predetermined length is attached to the non-anode active material portion.

The cathode plate 112 includes a cathode active material portion formed by applying a cathode active material onto a surface of a cathode current collector made out of nickel or the like, and a non-cathode active material portion absent of the cathode active material. The cathode active material may be a carbon material such as crystalline carbon, carbon composite, or carbon fiber, a lithium metal, or a lithium alloy. A cathode tab 115 having a predetermined length is attached to the non-cathode active material portion.

The electrode assembly 110 may be manufactured by inserting the separator 113 between the anode plate 111 and the cathode plate 112 to form a stack and winding the stack to produce a jelly-roll shape. The electrode assembly 110 includes the anode tab 114 and the cathode tab 115 in order to be electrically connected to the outside. The anode tab 114 is electrically connected to the anode plate 111, and the cathode tab 115 is electrically connected to the cathode plate 112. Insulating tapes 116 and 117 may be respectively provided on the anode tab 114 and the cathode tab 115 to insulate the anode tab 114 and the cathode tab 115 from upper and lower case portions 120a and 120b.

The case 120 receives the electrode assembly 110 therein, and includes the upper case portion 120a and the lower case portion 120b. Upper case portion 120a forms a back surface 120ab of case 120 while lower case portion 120b forms a front surface 120bf of case 120. The upper case portion 120a and the lower case portion 120b are integrally adhering to each other along edges thereof to seal the electrode assembly 110 within. A receiving space S in which the electrode assembly 110 is received may be formed in the lower case portion 120b by press working.

The case 120 may have a multi-layer structure including a thermal bonding layer 121 that has thermal fusibility and acts as a sealing member, a metal layer 122 that includes a metal, maintains a mechanical strength, and acts as a barrier for preventing moisture and oxygen from penetrating, and an insulating layer 123. The thermal bonding layer 121 is formed on a first surface of the metal layer 122, and the insulating layer 123 is formed on a second surface of the metal layer 122 which is opposite to the first surface of the metal layer 122.

The metal layer 122 may be made out of a material such as aluminum, steel, or stainless steel. The thermal bonding layer 121 may be a polyolefin layer formed of, for example, cast polypropylene. The insulating layer 123 may be made out of polyethylene terephthalate (PET) or nylon, however, the present embodiment is not limited thereto.

After the electrode assembly 110 is received within the receiving space S of the lower case portion 120b, edges of the upper case portion 120a and the lower case portion 120b may be adhering to each other via a thermal bonding technique or the like. The anode tab 114 and the cathode tab 115 are drawn out through a terrace portion 126 that is any one of adhering surfaces between the upper case portion 120a and the lower case portion 120b, and first and second wing portions 124a and 124b (which may be referred to as wing portions 124) are provided on sides perpendicular to the terrace portion 126.

The first and second wing portions 124a and 124b are bent to surround side surfaces of the bare cell B. In this case, the first and second wing portions 124a and 124b may be bent to be substantially parallel to side surfaces of the lower case portion 120b. Referring to FIG. 4, the first and second wing portions 124a and 124b are formed such that the upper case portion 120a and the lower case portion 120b overlap each other and the metal layer 122 is partially exposed through ends of the first and second wing portions 124a and 124b. If an electrolyte leaks while the battery cell 10 is used for a long time, a short circuit may occur through the metal layer 122. In order to prevent this, the metal layer 122 needs to be insulated.

Case 120 may be constructed from an upper portion 120a forming a back surface 120ab of case and being located opposite to, and matingly engaging a lower portion 120b forming a front surface 120bf of case 120, and a first wing portion 124a located opposite to a second wing portion 124b, with each of the first and second wing portions corresponding in position to the seams where edges of the front portion are sealed to the back portion. Each of the upper and lower portions may be constructed from a metal layer arranged between an electrical insulating layer and a thermal bonding layer, with an electrical insulating film being adhered to and covering each of the wing portions along the lengths of the seam created at junctions formed by corresponding wing portions 124 and the front surface 120bf of case 120. In one exemplary design, the secondary battery may be constructed with an electrode assembly, a case that receivingly accommodates the insertion of the electrode assembly, the case including a front surface positioned opposite a back surface and a first wing portion positioned opposite a second wing portion, and an insulating film that is bent along a length of a junction between the front surface and each of the first wing portion and the second wing portion, while a pair of holes in the insulating film are held in parallel alignment with respect to the length of the junction, the insulating film adhering to and covering an adjoining portion of the front surface and each of the first wing portion and the second wing portion along lengths of the first and second wing portions. As in FIGS. 4 and 17, an insulating film is bent along a length of a junction between the front surface and each of the first wing portion and the second wing portion, while one edge of the insulating film is held in parallel alignment with respect to the length of the junction, the insulating film adhering to and covering an adjoining portion of the front surface and each of the first wing portion and the second wing portion along lengths of the first and second wing portions.

The electrically insulating films 130 are provided on both sides of the bare cell B to surround the wing portions 124, to maintain sealing states of the wing portions 124 that are edge portions of the bare cell B and prevent a short circuit through the metal layer 122.

Each of the insulating films 130, which are bent to have substantially L-shapes, include a first portion 131 corresponding to each of the wing portions 124 and a second portion 132 bent from the first portion 131. If the insulating films 130 are flat, rather than bent, and each includes only the first portion 131, the insulating films 130 may not be in close contact with the bare cell B and may delaminate from the bare cell B. This may become more severe when a thickness of the bare cell B is small. Also, the metal layer 122 may be directly exposed to the outside.

The first portions 131 of the insulating films 130 are adhering to outer surfaces of the wing portions 124, and the second portions 132 of the insulating films 130 are adhering to the bare cell B to be substantially perpendicular to the first portions 131. If the wing portions 124 are bent to be substantially parallel to side surfaces 120bs of the lower case portion 120b, the second portions 132 of the insulating films 130 are adhering to a front surface 120bf of the lower case portion 120b, so that the wing portions 124 are in close contact with the bare cell B.

Figure 5:
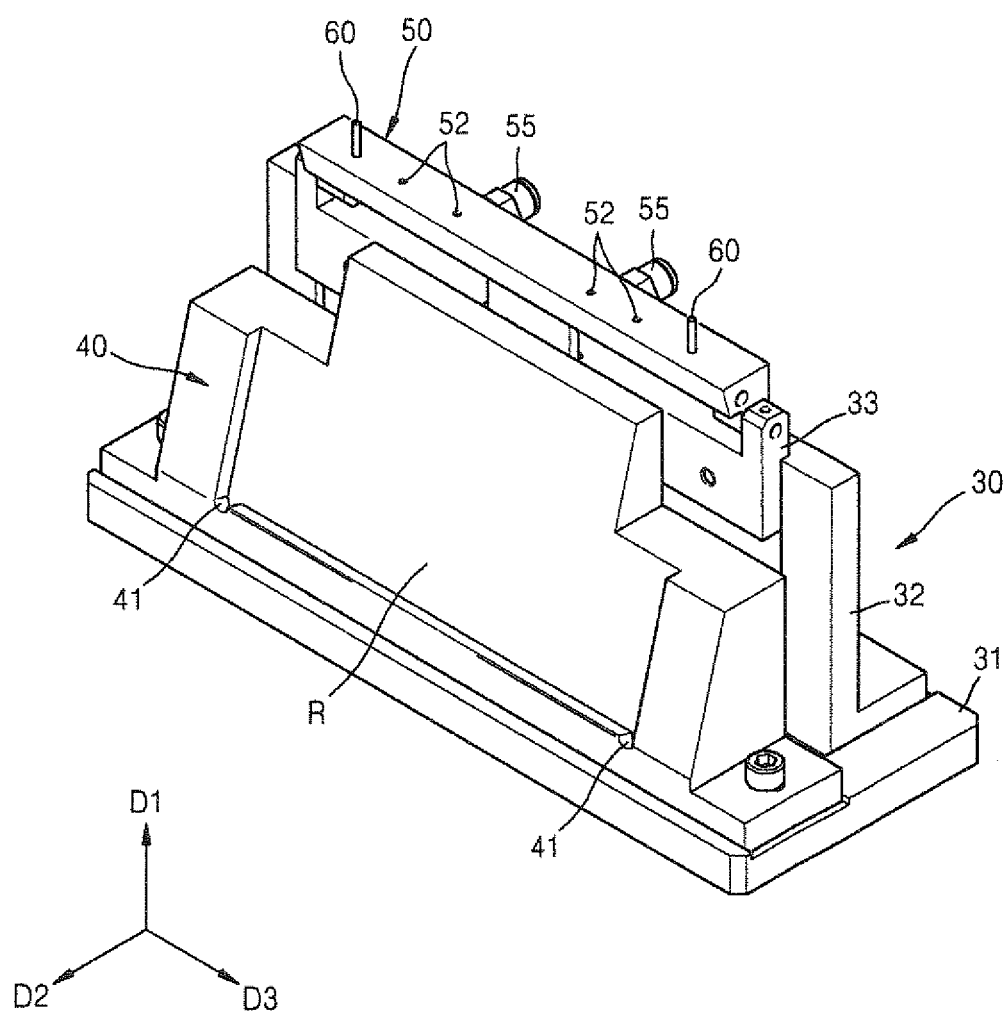
FIG. 5 is an oblique view illustrating an insulating film attaching jig according to an embodiment of the present invention.

Turning now to FIG. 5, a jig for attaching the insulating films 130 to the bare cell B by using a method of manufacturing of the battery cell 10 constructed as described above will now be discussed. FIG. 5 is an oblique view illustrating an insulating film attaching jig (hereinafter, referred to as a 'jig') according to an embodiment of the present invention. The jig includes a support 30, a cell mount 40, and a film support 50. The support 30 forms a frame of the jig. For example, after a first support 31 which acts as a base surface, a second support 32, and a third support 33 are separately formed, the first through third supports 31, 32, and 33 may be coupled to one another to form the frame of the jig.

For example, the first support 31 and the second support 32 perpendicular to the first support 31 may be detachably coupled to each other by using mechanical fastening members such as bolts. The second support 32 and the third support 33 for connecting the second support 32 to the film support 50 may be coupled to each other by using mechanical fastening members such as bolts. Alternatively, the first and second supports 31 and 32, and the second and third supports 32 and 33 may be coupled by using a permanent method such as welding. Alternatively, the frame of the jig may be integrally formed.

Figure 6A:
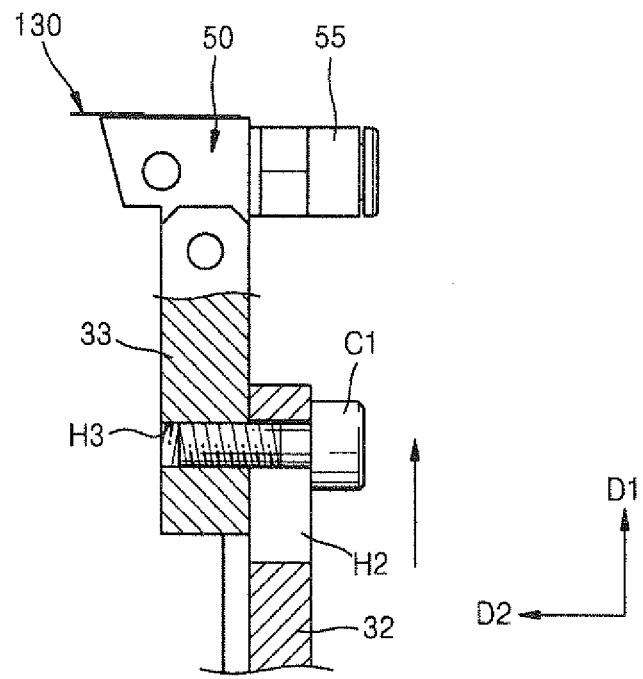
FIGS. 6A and 6B are side-sectional views illustrating relative positions of a second support and a third support of the jig of FIG. 5.
Figure 6B:
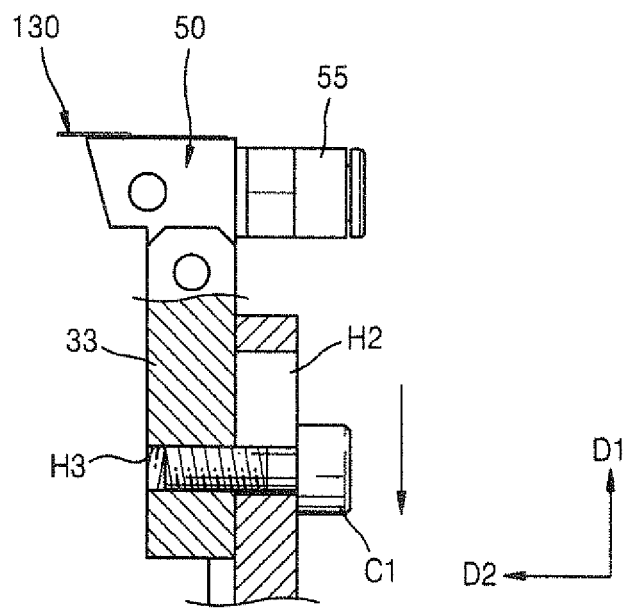

Turning now to FIGS. 6A and 6B, FIGS. 6A and 6B are side-sectional views illustrating relative positions of the second support 32 and the third support 33 of the jig of FIG. 5. Referring to FIGS. 6A and 6B, the second support 32 and the third support 33 are coupled to each other by using a bolt C1, and in this case, coupling holes H2 and H3 into which the bolts C1 are inserted are formed in the second support 32 and the third support 33 respectively. The coupling hole, such as an elongated slot H2, formed in the second support 32 is longitudinally formed in a ±D1 direction (a vertical direction) and thus a relative position of the third support 33 to the second support 32 may be adjusted. For example, if the bolt C1 passes through a lowermost end of the coupling hole, such as an elongated slot H2, formed in the second support 32 and the coupling hole H3 of the third support 33, the third support 33 is disposed at a lowest position from a bottom surface of the first support 31 and the film support 50 connected to the third support 33 is disposed at a lowest position. If the bolt C1 passes through an uppermost end of the coupling hole, such as an elongated slot H2, formed in the second portion 32 and the coupling hole H3 of the third support 33, the third support 33 is disposed at a highest position from the bottom surface of the first support 31 and the film support 50 connected to the third support 33 is disposed at a highest position.

As described above, a height of the film support 50 may be adjusted by adjusting relative positions of the second support 32 and the third support 33. For example, if the insulating films 130 are attached to the bare cell B having a small size, the film support 50 may be adjusted to have a low height, and if the insulating films 130 are attached to the bare cell B having a large size, the film support 50 may be adjusted to have a high height. In this manner, the insulating films 130 may be attached to various types of bare cells B.

The cell mount 40 provides a mount space R for mounting the bare cell B thereon in order to attach the insulating films 130 thereto. The bare cell B is mounted in the mount space R such that the first wing portion 124a is disposed adjacent to the film support 50. The mount space R may have an inclined surface such that the bare cell B is stably mounted in the mount space R.

Although the bare cell B is obliquely mounted in FIGS. 6A and 6B, the present embodiment is not limited thereto. As long as the first wing portion 124a of the bare cell B is disposed adjacent to the film support 50, an arrangement of the bare cell B is not limited.

As illustrated in FIG. 5, the film support 50 includes suction holes 52 as well as fixing members 60 that protrude upward in order to guide the insulating film 130 and to determine the correct location for the insulating film 130 on the film support 50. The fixing members 60 are protrusions that guide the position of the insulating film 130 and the backing paper 140 to the film support 50. The fixing members 60 may be arranged at both ends of the film support 50, the fixing members 60 passing through at least the backing paper 140 attached to the insulating film 130 and possibly also the insulating film 130 to guide as well as align the insulating film 130 to the film support 50. The suction holes 52 also serve to fix the insulating film 130 to the film support 50 by air suction. More specifically, the suction holes 52 fix a backing paper (or release paper) 140 attached to an insulating film 130 to the film support 50 by air suction. The fixing of the insulating film 130 by using the suction holes 52 is performed by using a vacuum device (not shown) connected through a tube (not shown) to the vacuum ports 55. Vacuum ports 55, which are fluidly connected to the suction holes 52, are provided at one side of the film support 50, and the tube fluidly connects the vacuum ports 55 to the vacuum device. Consequently, in the present invention, it is the combination of the suction at the suction holes 52 and the use of the fixing members 60 that serve to fix and align the insulating film 130 to the film support 50.

Figure 7A:
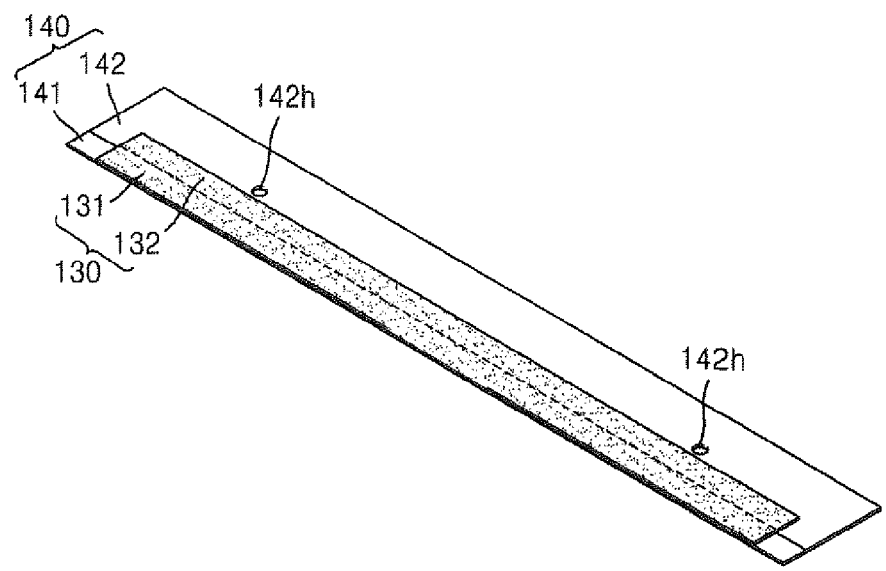
FIG. 7A is an oblique view illustrating an insulating film attached to a bare cell by using the jig of FIG. 5.
Figure 7B:
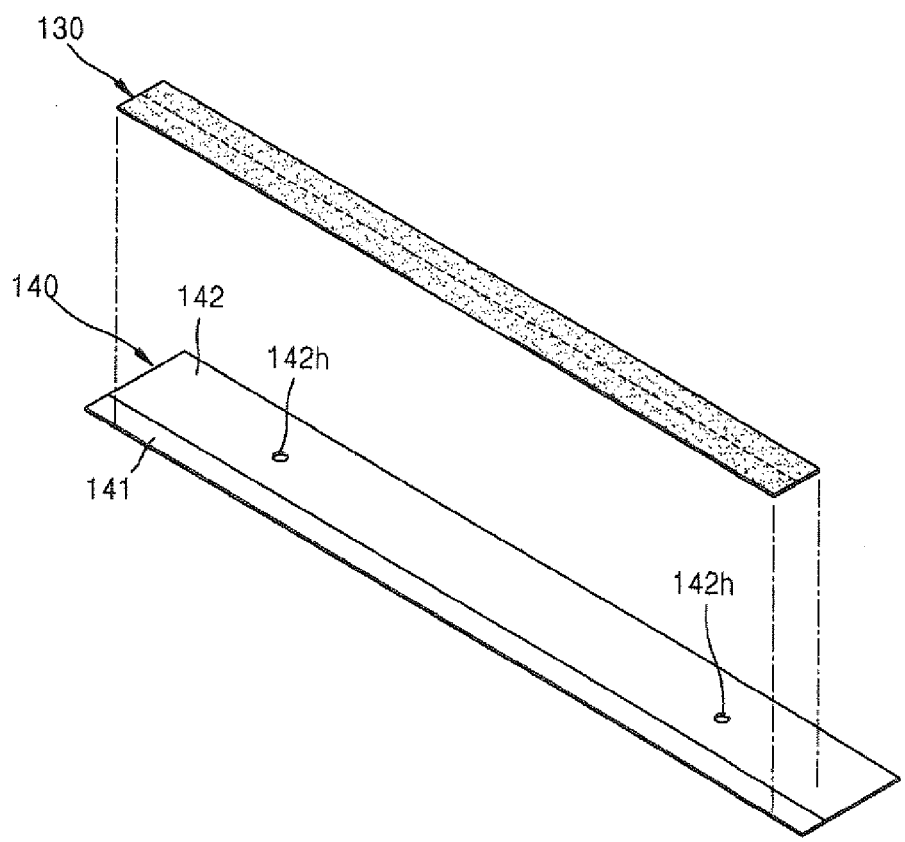
FIG. 7B is an exploded oblique view of the insulating film of FIG. 7A.

Turning now to FIGS. 7A and 7B, FIG. 7A is an oblique view illustrating each of the insulating films 130 attached to the bare cell B by using the jig and FIG. 7B is an exploded oblique view of the insulating film 130 of FIG. 7A. Referring to FIGS. 7A and 7B, the insulating film 130 includes an adhesive surface in order to be attached to the bare cell B, and is provided with a backing paper 140 attached to the adhesive surface. The insulating film 130, which is finally attached to a side of the bare cell B, includes an insulating material. The insulating film 130 may be roughly divided into two portions, that is, the first portion 131 and the second portion 132 described above with reference to FIGS. 1 and 2.

The adhesive surface is formed by applying an adhesive material to one surface of the insulating film 130. Alternatively, the adhesive surface may be formed by attaching a double-sided tape, rather than an adhesive material, to one surface of the insulating film 130.

In order to prevent foreign substances from attaching themselves to the adhesive surface before the insulating film 130 is attached to the bare cell B, the backing paper 140 is disposed on the adhesive surface. The backing paper 140 may include a first backing paper 141 and a second backing paper 142.

The first backing paper 141 corresponds to the first portion 131 of the insulating film 130, and the second backing paper 142 corresponds to the second portion 132 of the insulating film 130. When the insulating film 130 is disposed on the film support 50, the first portion 131 projects toward the wing portions 124 from the film support 50 while the second portion 132 is disposed on the film support 50. Accordingly, when the insulating film 130 is disposed on the film support 50, the first backing paper 141 is removed and the second backing paper 142 remains attached to the insulating film 30 and the film support 50.

A size of the backing paper 140 may be greater than a size of the insulating film 130. For example, since a size of the second backing paper 142 may be greater than a size of the second portion 132 of the insulating film 130, and the insulating film 130 may be fixed to the film support 50 via the second backing paper 142. To this end, through-holes 142h corresponding to the fixing members 60 are formed in the second backing paper 142.

Figure 8:
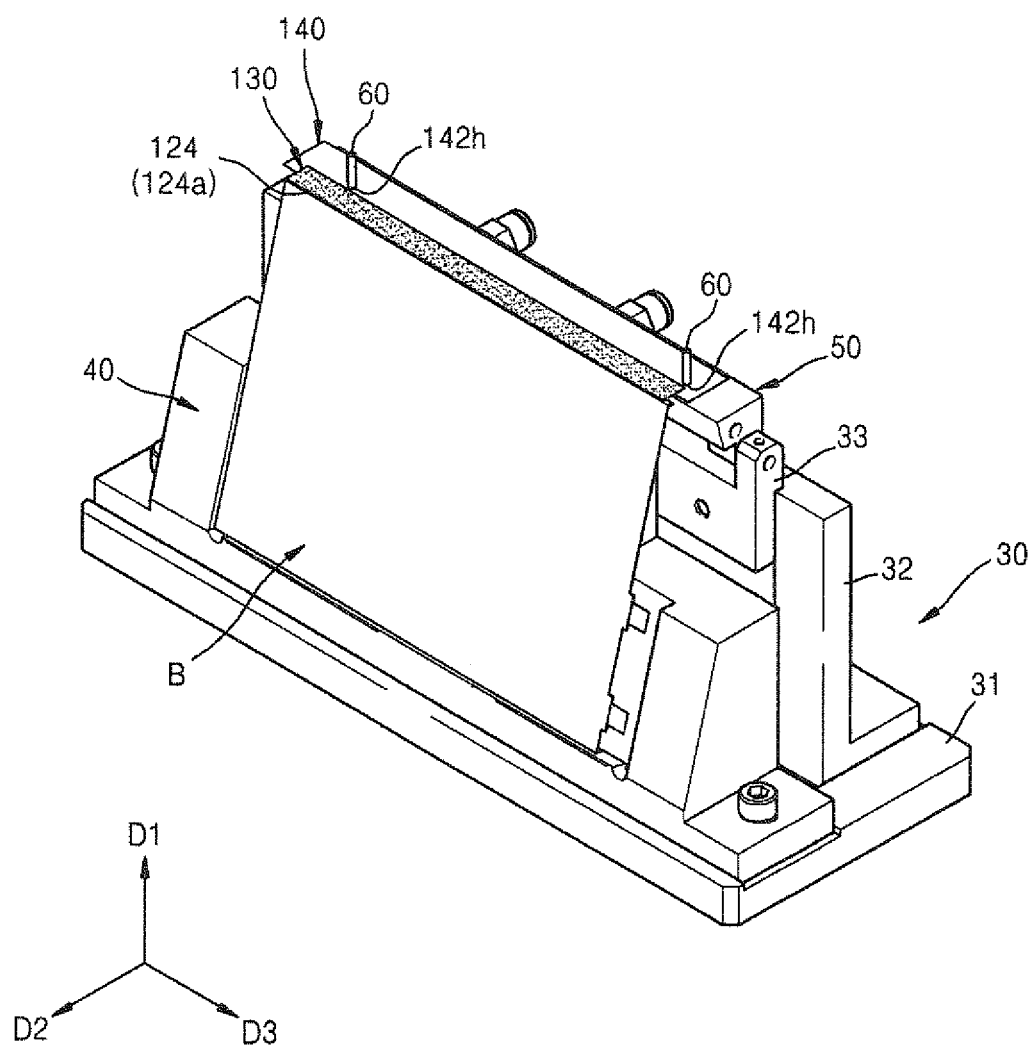
FIG. 8 is an oblique view illustrating a state where the insulating film and the bare cell are mounted on the jig of FIG. 5.

An arrangement of the insulating film 130 on the jig and a process of attaching the insulating film 130 to the bare cell B by using the jig will now be explained with reference to FIGS. 8 through 11. FIG. 8 is an oblique view illustrating a state where the insulating film 130 and the bare cell B are mounted on the jig of FIG. 5 while FIG. 9 is a side view of FIG. 8.

Referring to FIG. 8, the bare cell B is mounted in the mount space R of the cell mount 40, such that the first wing portion 124a is parallel to the film support 50. In a state described with reference to FIGS. 7A and 7B, the through-holes 142h of the second backing paper 142 are aligned with the fixing members 60, and then the fixing members 60 are inserted into the through-holes 142h of the second backing paper 142, such that the position of the second backing paper 142 is guided and aligned. Next, the first backing paper 141 is removed with the first portion 131 of the insulating film 130 projecting towards the first wing portion 124a from the film support 50 while the second portion 132 of the insulating film 130 is disposed on the film support 50 with the second backing paper 142 therebetween.

Since the suction holes 52 are formed under the second backing paper 142, the second backing paper 142 is fixed by air suction as well as by the fixing members 60. If the second backing paper 142 is fixed by using only the fixing members 60, a fine positional error may occur due to tolerances between the through-holes 142h and the fixing members 60. However, since a fixing structure using all of the fixing members 60 and the suction holes 52 may prevent a movement of the insulating film 130 in advance, the insulating film 130 may be attached accurately onto the first wing portion 124a.

Figure 9:
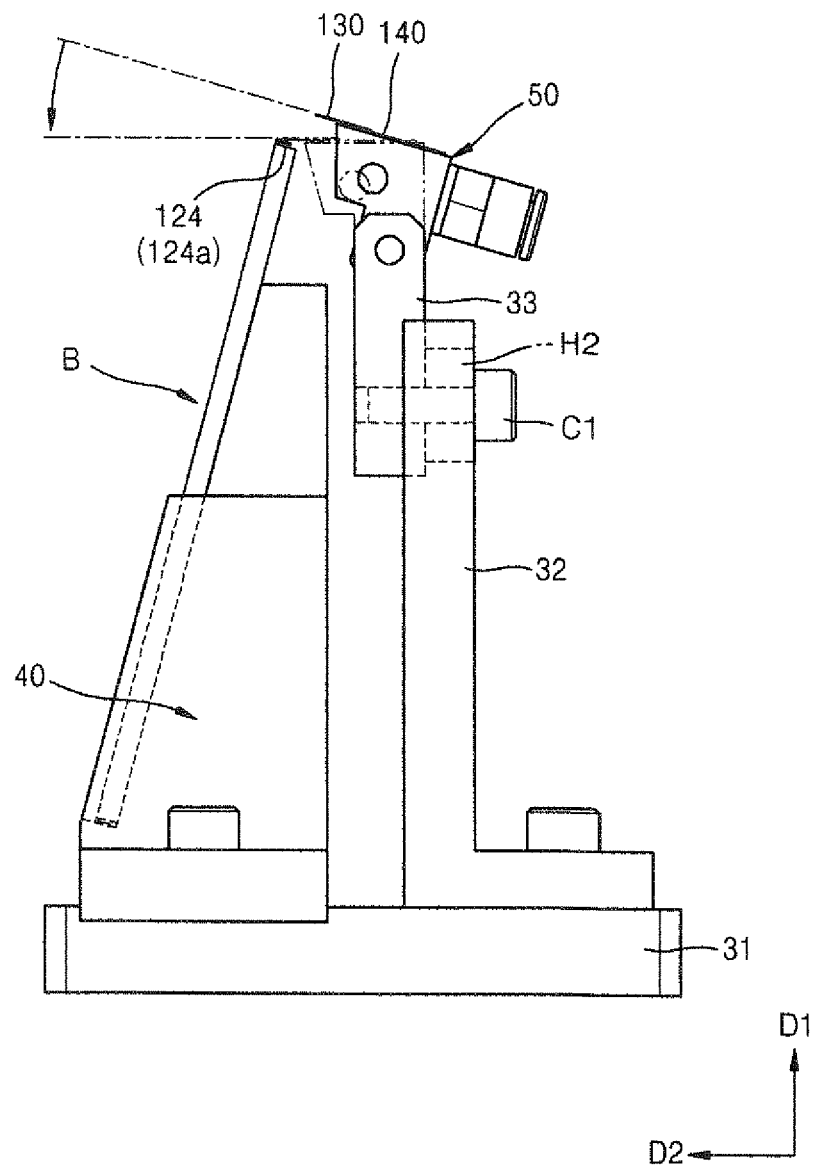
FIG. 9 is a side view of FIG. 8.

Referring now to FIG. 9, a first end of the film support 50 is pivotably coupled to a first end of the third support 33. The film support 50 is pivotable about an axis in a D3 direction that is parallel to a side surface of the bare cell B.

For example, when the film support 50 is tilted back around the axis to face upwards, the insulating film 130 on which the second backing paper 142 is provided as described above is also tilted back to reach the position shown in FIG. 9. In this case, as the film support 50 is pivoted, the first portion 131 of the insulating film 130 with the adhesive surface exposed may be attached to an outer surface of the first wing portion 124a.

The first wing portion 124a and the insulating film 130 may be accurately aligned by rotating the film support 50. Accordingly, even when a thickness of the side surface of the bare cell B is small, the insulating film 130 may be easily and simply adhering thereto.

Figure 10:
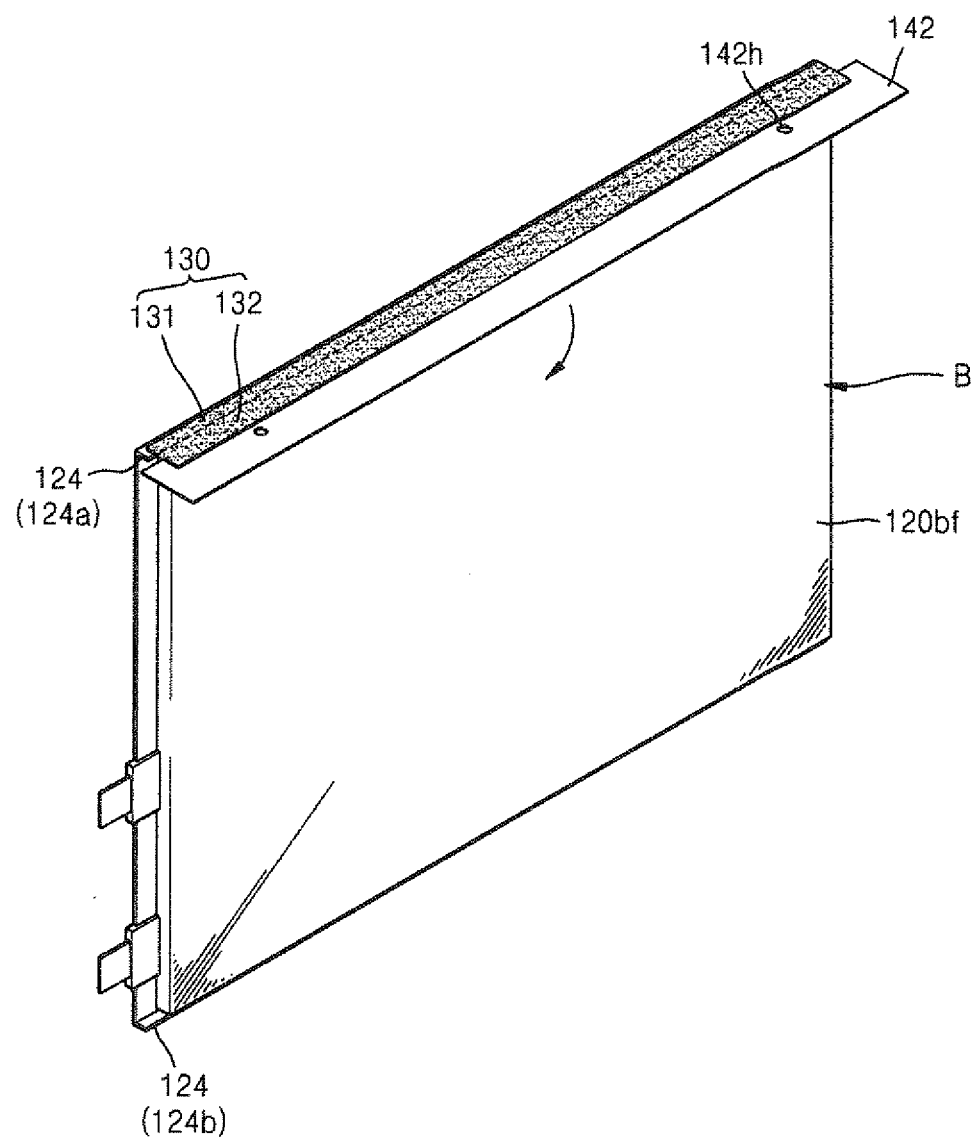
FIG. 10 is an oblique view illustrating a state where the bare cell and the insulating film are separated from the jig of FIG. 9.
Figure 11:
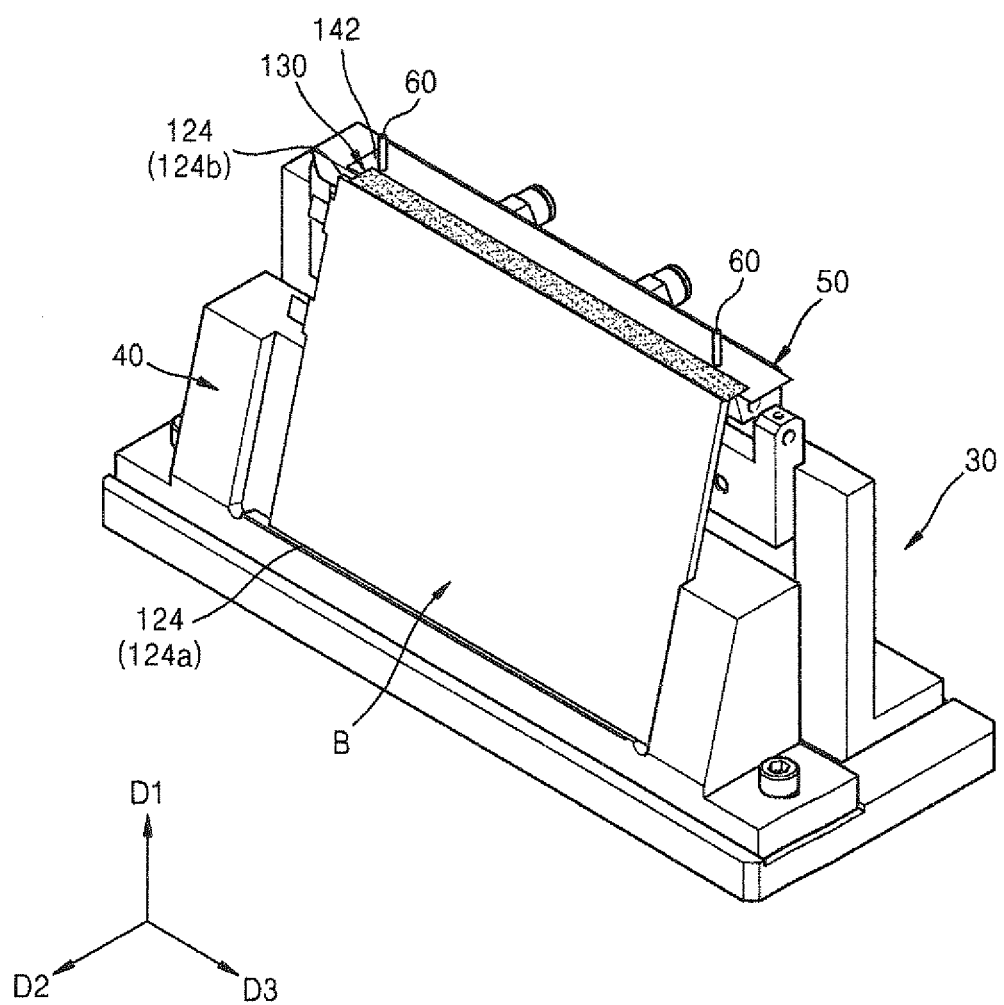
FIG. 11 is a view illustrating a state where the bare cell to which the insulating film is attached is mounted again on the jig in the state of FIG. 10.

Turning now to FIGS. 10 and 11, FIG. 10 is an oblique view illustrating a state where the first portion 131 of the insulating film adhering to the bare cell B are separated from the jig of FIG. 9 and FIG. 11 is an oblique view illustrating a state where the bare cell B to which the insulating film 130 is attached in the state of FIG. 10 is mounted again on the jig.

Referring to FIGS. 9 and 10, the first portion 131 of the insulating film 130 is attached to the first wing portion 124a, and then the bare cell B and insulating film combination are separated from the jig. In this case, the bare cell B may be easily separated from the jig by using a groove 41 formed in a lower edge of the cell mount 40.

Referring to FIG. 10, in a state where the first portion 131 of the insulating film 130 is attached to the first wing portion 124a, the second backing paper 142 is removed. Next, the second portion 132 of the insulating film 130 is attached to the front surface 120bf of the case 120. In this case, the second portion 132 of the insulating film 130 is attached to the first portion 131 while being bent to be substantially perpendicular with respect to the first portion 131 as described above. In this manner, the insulating film 130 is attached to the first wing portion 124a that is formed on the first side of the bare cell B. In order to attach the insulating film 130 to the second wing portion 124b that is formed on the second side of the bare cell B which is opposite to the first side of the bare cell B, the bare cell B is again mounted on the jig.

Referring now to FIG. 11, when the bare cell B is mounted on the cell mount 40, the second wing portion 124b is disposed adjacent to the film support 50. A process of attaching the insulating film 130 to the second wing portion 124b is the same as that described with reference to FIGS. 7 through 10, and thus a detailed explanation thereof will not again be given here.

Figure 12:
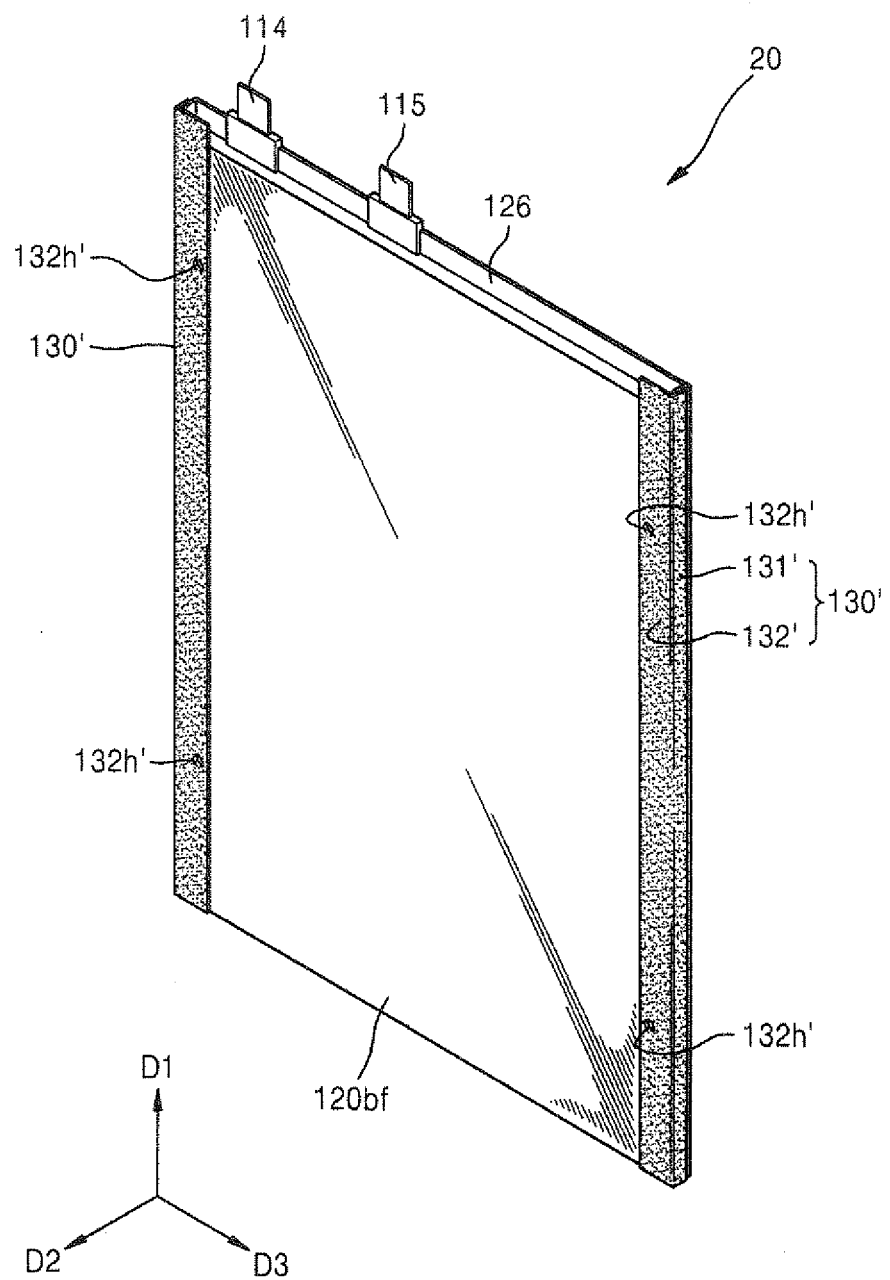
FIG. 12 is an oblique view illustrating a battery cell according to a second embodiment of the present invention.

Turning now to FIG. 12, FIG. 12 is an oblique view illustrating a battery cell 20 according to a second embodiment of the present invention. Referring to FIG. 12, the battery cell 20 includes the electrode assembly 110, the case 120, and insulating films 130'. A first portion 131' of each of the insulating films 130' are adhering to each of the wing portions 124 and a second portion 132' are adhering to the front surface 120bf as described above with reference to FIGS. 1 through 4.

However, there is a difference between the battery cell 10 of FIG. 1 and the battery cell 20 of FIG. 12 in that through-holes 132h' are formed in the insulating films 130' that cover the wing portions 124 formed on both sides of the battery cell 20. The following explanation will focus on this difference.

Figure 13A:
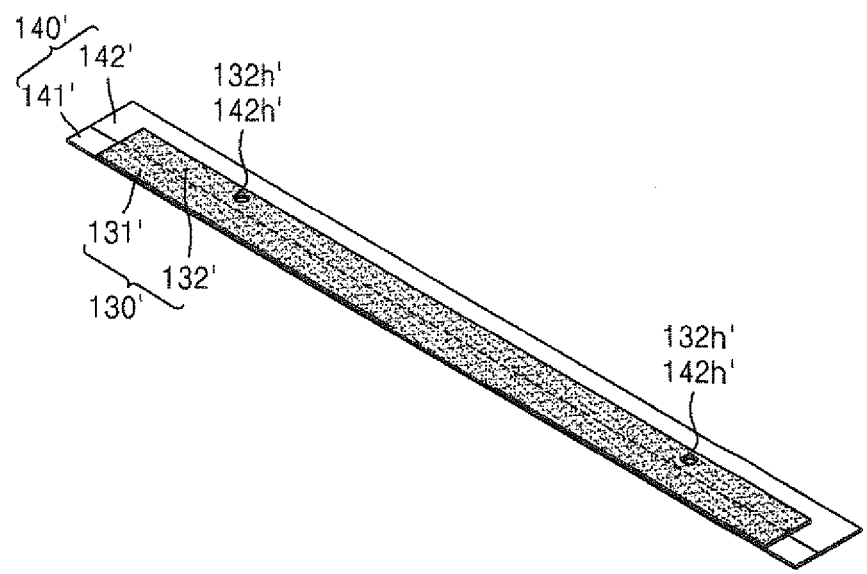
FIG. 13A is an oblique view illustrating an insulating film attached to a case of the battery cell of FIG. 12.
Figure 13B:
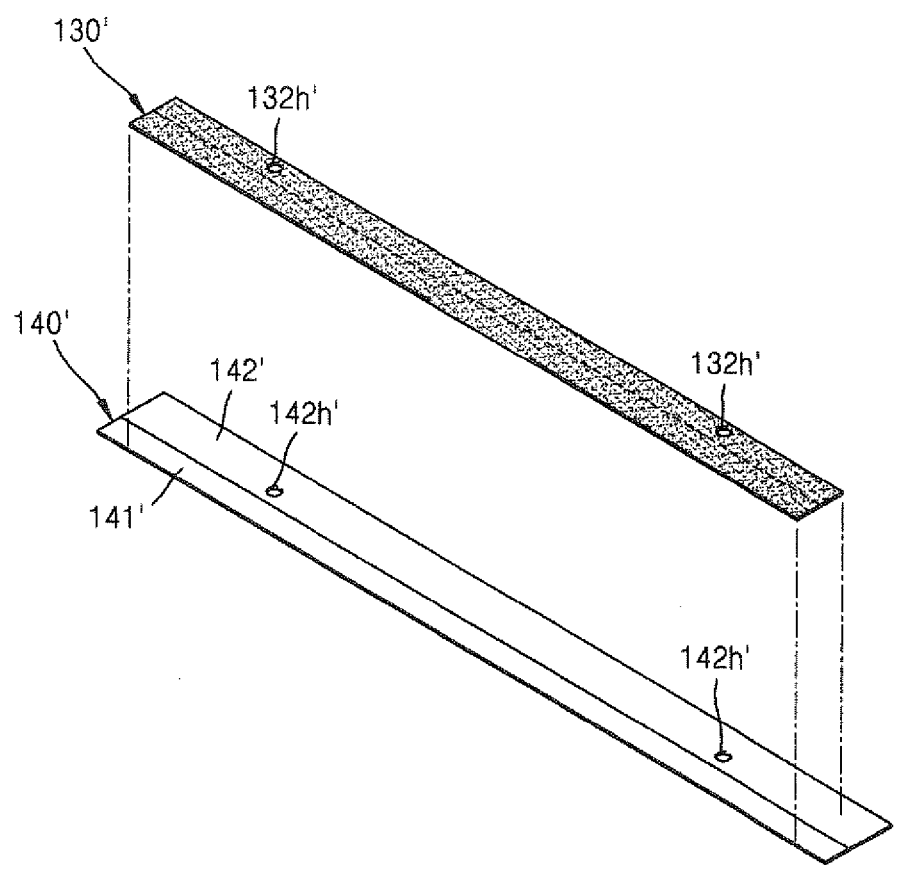
FIG. 13B is an exploded oblique view of FIG. 13A.

Turning now to FIGS. 13A and 13B, FIGS. 13A and 13B are respectively an oblique view and an exploded oblique view of each of the insulating film 130'/backing paper 140' combination prior to use. Referring to FIGS. 13A and 13B, the insulating film 130' includes an adhesive surface on one side in order to be attached to the case 120, and is provided with a backing paper 140' attached to the adhesive surface. The insulating film 130', which is finally attached to a side of the case 120, includes an insulating material. The insulating film 130' may be roughly divided into two portions, that is, a first portion 131' and a second portion 132'.

The adhesive surface is formed by applying an adhesive material to one surface of the insulating film 130'. Alternatively, the adhesive surface may be formed by attaching a double-sided tape, rather than an adhesive material, to one surface of the insulating film 130'. In order to prevent foreign material from attaching to the adhesive material of the insulating film 130' prior to use, the backing paper 140' is arranged on the adhesive surface. The backing paper 140' may include a first backing paper 141' and a second backing paper 142' to correspond to the first portion 131' and to the second portion 132' respectively.

The first backing paper 141' corresponds to the first portion 131' of the insulating film 130', and the second backing paper 142' corresponds to the second portion 132' of the insulating film 130'. When the insulating film 130' is disposed on the film support 50, the first portion 131' projects toward a wing portion 124 from the film support 50 and the second portion 132' is disposed on the film support 50. Accordingly, when the insulating film 130' is disposed on the film support 50, the first backing paper 141' is removed and the second backing paper 142' remains attached to the second portion 132' of the insulating film 130'.

A size of the backing paper 140' may be greater than a size of the insulating film 130' and may also be less than the size of the backing paper 140 of FIGS. 7A and 7B. While through-holes 142h are formed only in the second backing paper 142 in the first embodiment of FIGS. 7A and 7B, through-holes 132h' and 142h' are formed in both the second portion 132' of the insulating film 130' and in the second backing paper 142' in FIGS. 13A and 13B.

Figure 15:
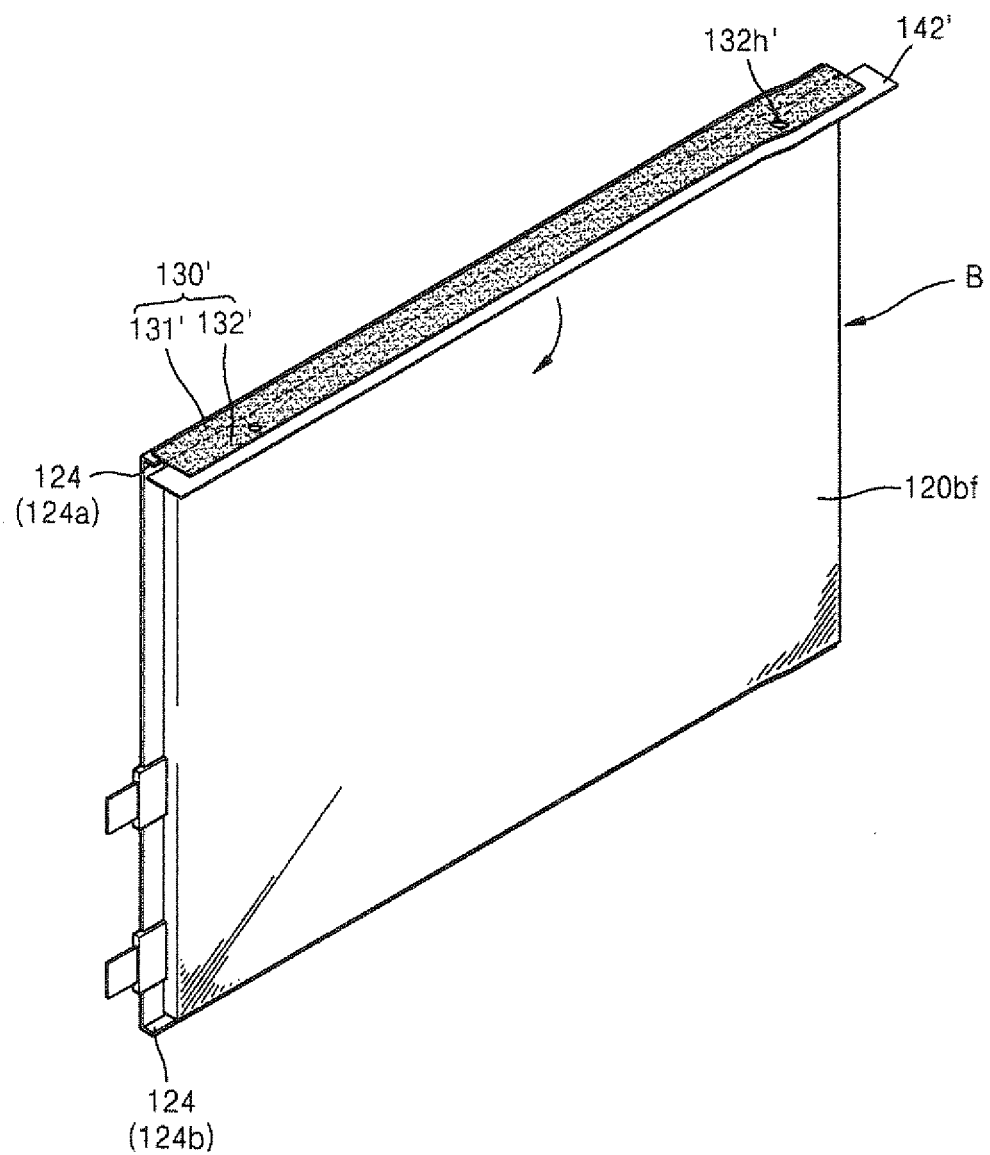
FIG. 15 is an oblique view illustrating a state where the bare cell to which the insulating film is attached is separated from the jig of FIG. 14.
Figure 16:
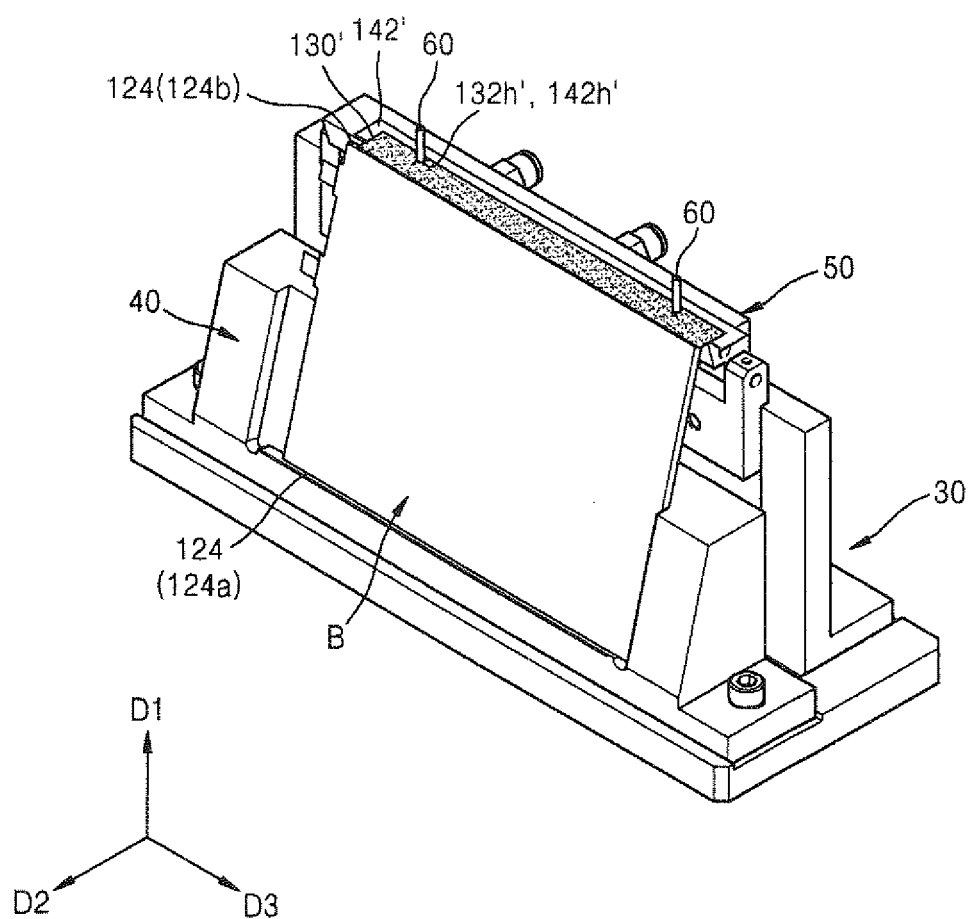
FIG. 16 is an oblique view illustrating a state where the bare cell including a first wing portion to which the insulating film is attached is mounted again on the jig in the state of FIG. 15.

A process of attaching the insulating films 130' of FIGS. 13A and 13B to the bare cell B by using the jig will now be explained with reference to FIGS. 14 through 16. The jig of FIGS. 14 through 16 is the same as the jig of FIGS. 5 through 9.

Figure 14:
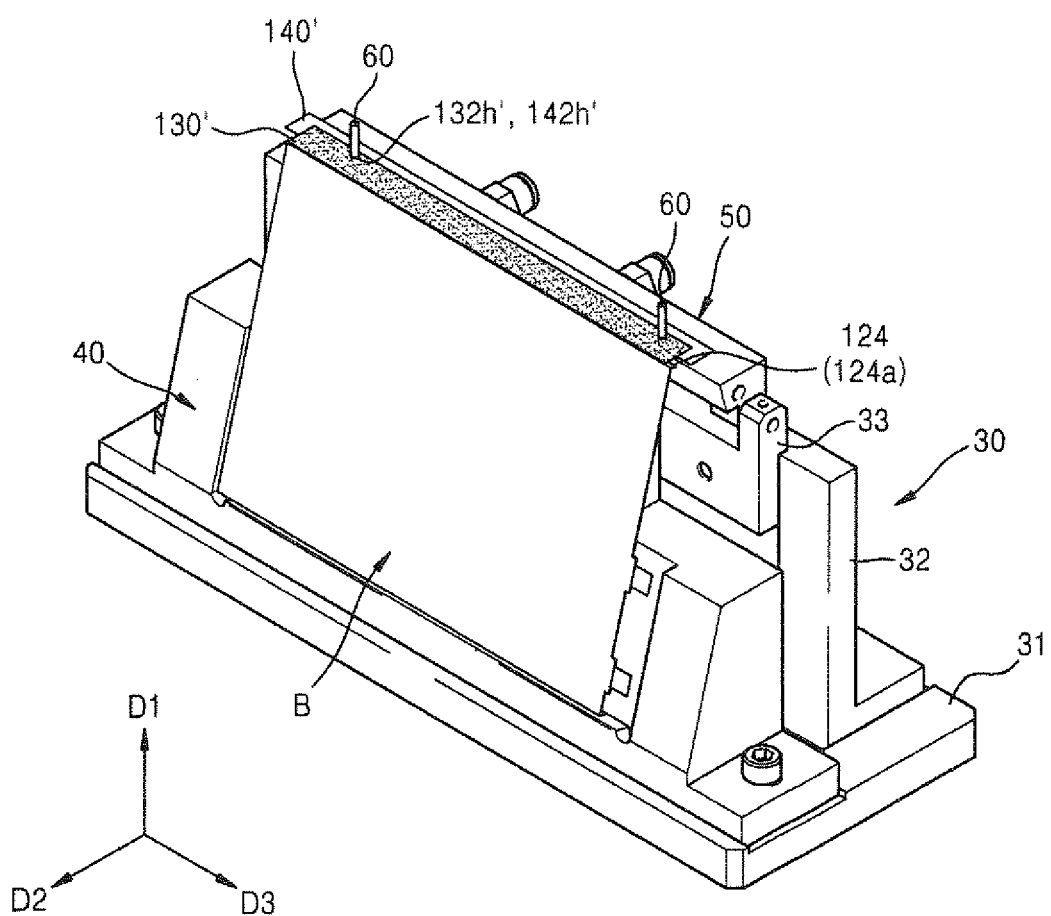
FIG. 14 is an oblique view illustrating a state where an insulating film and a bare cell are mounted on the jig.

Referring now to FIG. 14, FIG. 14 is an oblique view illustrating a state where the insulating film 130' and the bare cell B are mounted on the jig. As illustrated in FIG. 14, the battery cell 20 is mounted in the mount space R of the cell mount 40 such that the first wing portion 124a is disposed adjacent to and is parallel to the film support 50. In a state described with reference to FIGS. 13A and 13B, the through-holes 132h' and 142h' formed in the second portion 132' of the insulating film 130' and in the second portion of the backing paper 142' respectively that are aligned by fixing members 60 of the film support 50. Then the insulating film 130' and the backing paper 140' are fixed to the film support 50 by using the fixing members 60. The backing paper 140' attached to the insulating film 130' may also be attached to the film support via the suction holes 52. Next, when the first backing paper 141' is removed, the first portion 131' of the insulating film 130' projects from the film support 50 toward the first wing portion 124a and the adhesive side of the first portion 131' faces the first wing portion 124a while the second portion 132' of insulating film 130' remains fixed onto film support 50.

Since the suction holes 52 are formed under the second backing paper 142', the second backing paper 142' is fixed by air suction to the film support 50. If the second portion 132' of insulating film 130' and the second backing paper 142' are positioned on the film support 50 by using only the fixing members 60, a fine positional error may occur due to tolerances between the through-holes 132h' and 142h' and the fixing members 60. However, since a fixing structure using both fixing members 60 and the suction holes 52 may prevent a movement of the insulating film 130' in advance, the insulating film 130' may be accurately attached to a proper position on battery 20.

As in the first embodiment, the film support 50 of the second embodiment can pivot about an axis that extends in a D3 direction that is parallel to a side surface of bare cell B. As a result, the first wing portion 124a and the first portion 131' of the insulating film 130' may be accurately aligned by rotating the film support 50.

Referring now to FIG. 15, an oblique view illustrates a state where first portion 131' of insulating film 130' is attached to first wing portion 124a of bare cell B after bare cell B has been separated from the jig of FIG. 14. Referring to FIGS. 14 and 15, the second backing paper 142' is removed in a state where the insulating film 130' is attached to the first wing portion 124a, and then the second portion 132' of the insulating film 130' is attached to a front side 120bf of case 120. In this case, the second portion 132' of the insulating film 130' is attached to the first portion 131' while being bent to be substantially perpendicular with respect to the first portion 131', so that the insulating film 130' prevents the first wing portion 124a from being exposed to the outside.

Referring now to FIG. 16, an oblique view illustrates the bare cell B including the first wing portion 124a to which the insulating film 130' is attached, in conformance with the secondary battery shown by FIG. 15 is again mounted on the jig. In order to attach another insulating film 130' to the second wing portion 124b, the bare cell B is again mounted on the jig. Referring now to FIG. 16, when the bare cell B is mounted on the cell mount 40, the second wing portion 124b is disposed adjacent to the film support 50. A process of attaching another insulating film 130' to the second wing portion 124b is the same as that described above with reference to FIGS. 14 and 15, and thus a detailed explanation thereof will not be given here.

Figure 17:
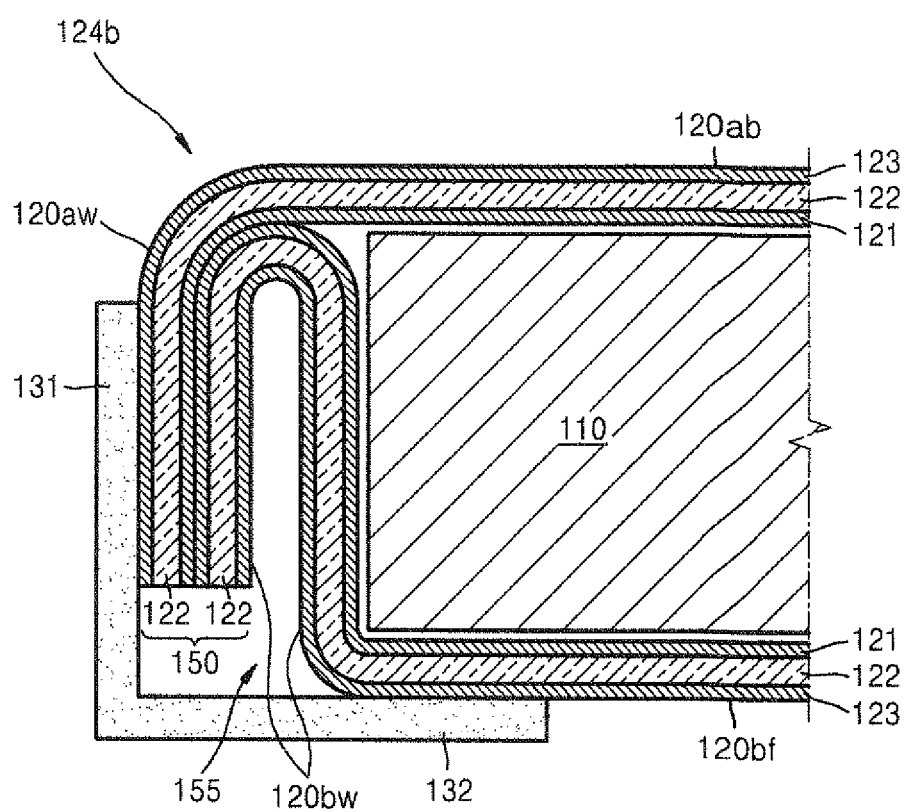
FIG. 17 is an enlarged cross-sectional view taken along sectional line IV-IV from FIG. 1.

FIG. 17 is an enlarged cross-sectional view taken along sectional line IV-IV from FIG. 1. As illustrated in FIG. 17, a junction 155 is formed where the wing portion 124b approaches the front surface 120bf of the casing 120. Insulating film 130 covers an exposed edge portion 150 of the casing 120 to prevent the exposed metal layers 122 from corroding. As illustrated in FIG. 17, upper case 120a and lower case 120b are folded together at the wing portions 124. Upper case 120a forms a back surface 120ab of case 120 and an edge portion or wing portion 120aw folded in wing portion 124. Likewise, lower case 120b forms front surface 120bf of case and edge portion 120bw folded onto 120aw in wing portion 124.

Figure 18A:
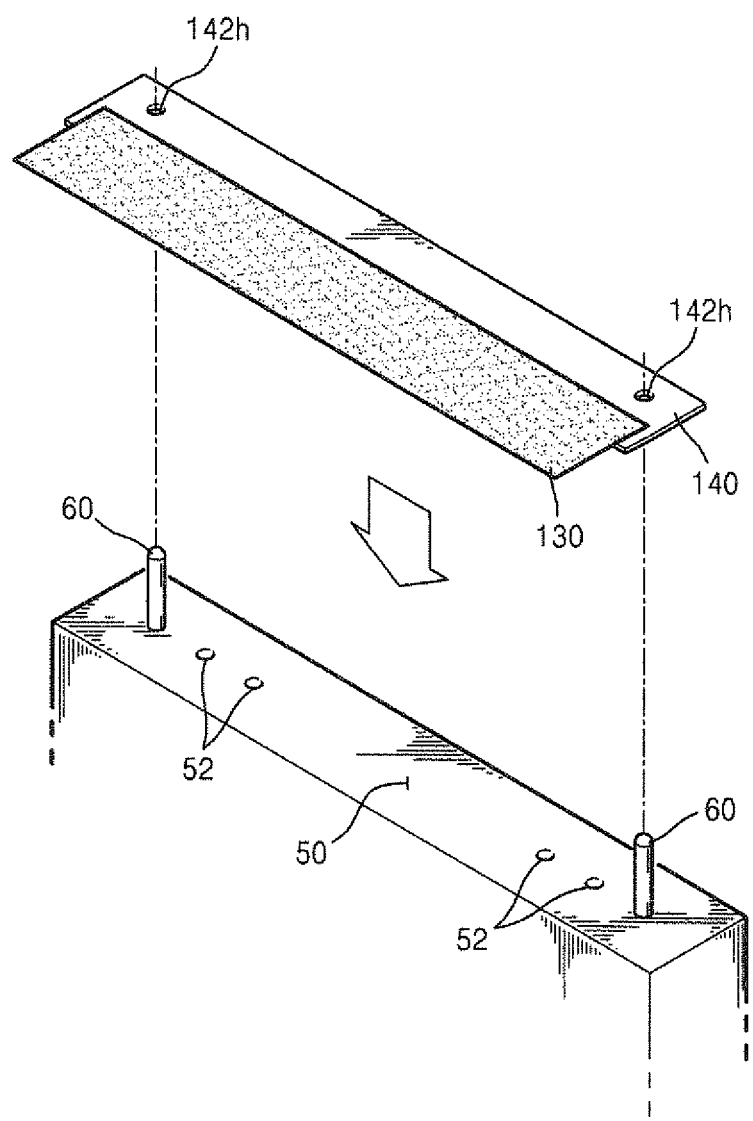
FIGS. 18A and 18B are oblique views illustrating a backing, or release paper, attached to an insulating film, undergoing a precise alignment with alignment pins that extend from the film support according to two embodiments of the present invention.
Figure 18B:
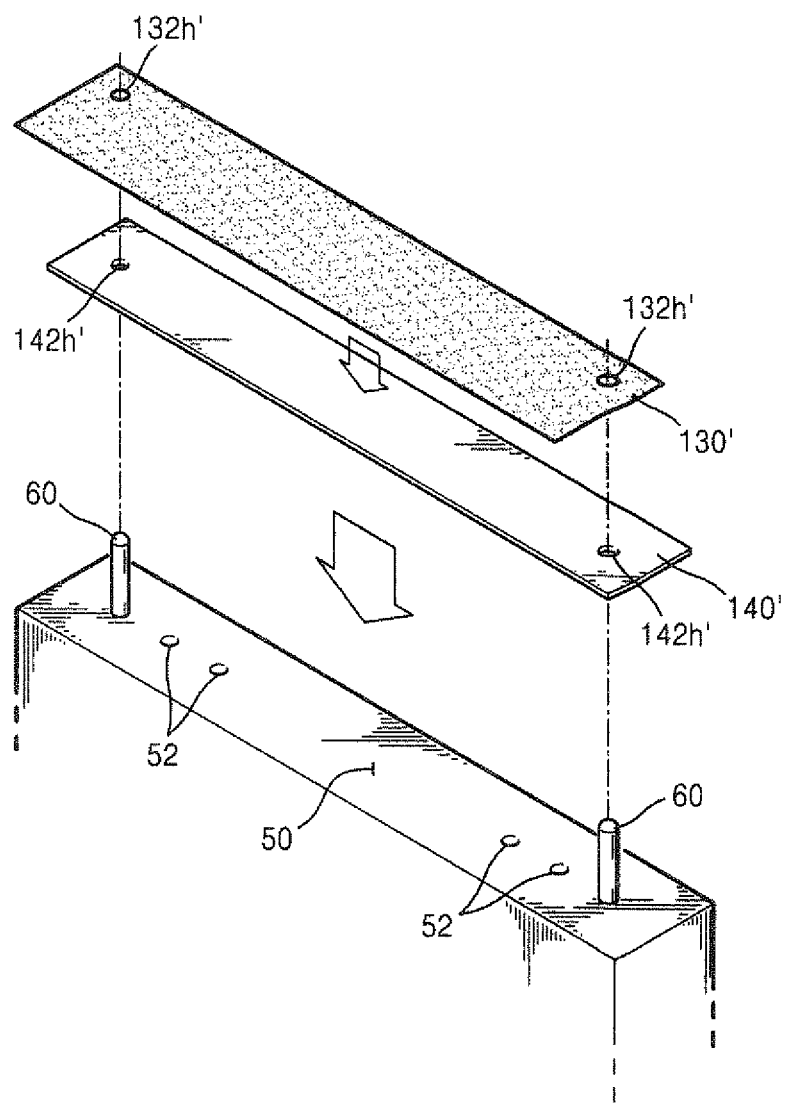

FIG. 18A is an oblique view illustrating a backing, or release paper, attached to an insulating film, undergoing alignment with alignment pins (or fixing members) 60 that extend from the film support in the embodiment illustrated by FIGS. 1 through 11, where only the release paper and not the insulating film is perforated by holes. The backing paper 140 attached to the insulating film 130 may also be attached to the film support 50 via the suction holes 52. FIG. 18B is an oblique view illustrating the insulating film 130', perforated by a pair of alignment holes 132h', undergoing alignment with holes 142h' in backing paper 140' and alignment pins 60 that extend from the film support 50 as in the embodiment of FIGS. 12-16. The backing paper 140' attached to the insulating film 130' may also be attached to the film support 50 via the suction holes 52.

Each of the upper case 120a and the lower case 120b may be constructed from a metal layer arranged between an electrical insulating layer and a thermal bonding layer, with an electrically insulating film adhering to and covering each of the wing portions along the lengths of the seam created at junctions formed by corresponding wing portions of the upper and lower portions 120a, 120b of case 120. In one exemplary design, the secondary battery may be constructed with an electrode assembly, a case that receivingly accommodates the insertion of the electrode assembly, the case 120 including upper portion 120a attached to lower portion 120b, where opposite edges of the upper and lower portions 120a and 120b are folded over to produce wing portions 124a and 124b.

The difference between a leak-free, commercially acceptable secondary battery and a leak-prone secondary battery lies within a very narrow range of tolerance and precision maintained during the fabrication of the batteries. Precise and accurate placement of the insulating film relative to the length of a seam created at junctions formed by the front portion and corresponding ones of the first wing portion and the second wing portion is necessary in order to assure the leak-free characteristic of the secondary battery, because a less than parallel alignment of the edges of the insulating film risks either a lack of coverage, or inadequate coverage, of the seam, and thus substantially increasing the risk of leakage of electrolyte, and a concomitant risk of exposure of a bare surface of an electrically conducting metal component for the secondary battery.

The foregoing description provides the details for the fabrication and use of a rechargeable secondary battery that may be constructed with a jig suitable for fabrication of a leak-free secondary battery, and a method for producing a secondary battery constructed with a case accommodating the electrode assembly. The case includes a front portion and a back portion terminated along opposite edges by a first wing portion and a second wing portion, with the insulating film bent along a length of a seam created at junctions formed by the front portion and corresponding ones of the first wing portion and the second wing portion, while a pair of holes in the release paper, or alternatively, both the release paper and the insulating film, are held, as, for example, by a pair of spaced-apart alignment pins passing through those holes, in parallel alignment with respect to the length of one of the junctions, with the insulating film adhering to and covering an adjoining portion of the front portion and the corresponding one of the first wing portion and the second wing portion, in order to prevent leakage of electrolyte, and to prevent corrosion of the electrically conducting metal components of the secondary battery. Alternatively, one edge of the insulating film may be held, as by the surface shape of, or recess within, the film support surface, in conjunction with alignment pins engaging through holes perforating the release paper, or both the insulating film and the release paper, or in conjunction with alignment pins abutting a longitudinal edge of the release paper, in near-perfect, parallel alignment with respect to the length of the junction, with the insulating film adhering to and covering the front portion and each of the first wing portion and the second wing portion along lengths of the first and second wing portions. Consequently, and in recognition of the minuteness of the dimensions of the battery, the thinness of the case, and the extremely fine difference in tolerance between a leak-free battery and a leak-prone battery, the construction of the jig fitted with spaced-apart alignment pins along the length of the film support surface, in conjunction with suction apertures, or holes, precisely and exactly assures a high degree of conformance between the edges of the length of the insulating film and the junctions formed by the seams of the first and second wing portions and the front portion of the case during fabrication.

The foregoing exemplars thereby fulfill a need for a different design for a pouch type battery, a method of making such a pouch type battery, and a jig suitable for the manufacture of a pouch type battery that reduces the likelihood of leakage of electrolyte from the battery cell, prevent the occurrence of a short electrical circuit from forming between an electrically conducting metal layer in the pouch case and an electrode of an electrode assembly.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A jig, comprising:
    a support;
    a film support arranged on top of the support and including a flat surface to support at least a part of an insulating film, the flat surface having a plurality of fixing members and a plurality of suction holes to prevent the insulating film from moving; and
    a cell mount coupled to the support and including an inclined surface to accommodate a battery cell thereon, wherein the inclined surface extends towards the film support so that a wing portion of the battery cell is arranged adjacent to the film support, wherein the inclined surface of the cell mount being a flat surface that accommodates a pouch-type battery cell.

2. The jig of claim 1, wherein the support comprises a plurality of supporting parts, a height of the film support is adjustable by adjusting a relative position of the supporting parts.

3. The jig of claim 1, the support comprising a first support, a second support and a third support, the first support being a base, the second support extending vertically and perpendicularly from the first support, the third support being arranged near a top of the second support, and the film support being arranged on the third support.

4. The jig of claim 3, wherein the film support is rotatable with respect to the support.

5. The jig of claim 4, the second support having an elongated slot that couples to a coupling hole in the third support by a bolt, the elongated slot in the second support being substantially larger than the coupling hole in the third support to allow the film support and the third support to be raised and lowered with respect to the first and second supports.

6. The jig of claim 1, wherein the film support further includes a vacuum port that communicates with the suction holes and attaches to tubing that connects to a vacuum pump.

7. The jig of claim 1, wherein the fixing members are alignment pins that protrude from the flat surface of the film support to guide and align the insulating film onto the flat surface.

8. The jig of claim 1, the fixing members being alignment pins that protrude from the flat surface of the film support, are arranged within the flat surface of the film support and are arranged at locations that correspond to a plurality of apertures perforating the insulating film.

9. The jig of claim 1, the fixing members being alignment pins that protrude from the flat surface of the film support are arranged at an interior of the flat surface of the film support and are arranged at locations that correspond to a plurality of apertures perforating a release paper attached to the insulating film.

10. The jig of claim 1, wherein the inclined surface of the cell mount being a flat surface that mates with one of a front and a back surface of a case for a pouch-type battery cell.

11. The jig of claim 3, wherein the flat surface of the film support can be inclined with respect to the support by having a first end of the film support pivotably coupled to a first end of the third support.

12. The jig of claim 3, wherein the flat surface of the film support can be tilted away from the cell mount by having a first end of the film support pivotably coupled to a first end of the third support.

13. The jig of claim 3, wherein the flat surface of the film support being pivotably coupled to the support about an axis that extends along a longitudinal direction of the jig.

14. The jig of claim 1, the fixing members being alignment pins that protrude from the flat surface of the film support, wherein a combination of the suction holes and the alignment pins to provide for precise and accurate placement of the insulating film with respect to wing portions of a battery cell mounted on the cell mount.

15. The jig of claim 1, the insulating film includes a first portion and a second portion, wherein the second portion of the insulating film is disposed on the film support such that the first portion of the insulating film projects toward the battery cell.

* * * * *